(12) United States Patent
Suzuki (10) Patent No.: US 7,116,711 B2
(45) Date of Patent: Oct. 3, 2006

(54) METHOD AND APPARATUS FOR REPRODUCING IMAGES

(75) Inventor: Ryoji Suzuki, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 614 days.

(21) Appl. No.: 09/965,985

(22) Filed: Sep. 28, 2001

(65) Prior Publication Data

US 2002/0037038 A1    Mar. 28, 2002

(30) Foreign Application Priority Data

Sep. 28, 2000    (JP)    ............................. 2000-296267

(51) Int. Cl.
*H04N 7/12*    (2006.01)
*H04N 5/225*    (2006.01)

(52) U.S. Cl. .................................. 375/240.01; 386/120

(58) Field of Classification Search ........... 375/240.01, 375/240.13; 386/331, 120, 111, 33
See application file for complete search history.

(56) References Cited

U.S. PATENT DOCUMENTS 6,011,868 A * 1/2000 van den Branden et al. ..... 382/233
6,262,723 B1 * 7/2001 Matsuzawa et al. ........ 345/723
6,754,272 B1 * 6/2004 Yamada et al. ........ 375/240.14

FOREIGN PATENT DOCUMENTS

| EP | 0948206 | 10/1999 |
|---|---|---|
| JP | 10-341412 | 12/1998 |
| JP | 11-289546 | 10/1999 |

OTHER PUBLICATIONS

European Search Report dated Mar. 18, 2003, application No. EP01122599.

* cited by examiner

*Primary Examiner*—Gims Philippe
(74) *Attorney, Agent, or Firm*—RatnerPrestia (57) ABSTRACT

A video reproduction apparatus reproduces a video based on a video bit stream having a plurality of pictures and also having a picture type of each of the plurality of pictures. The apparatus includes a picture type detection section for, while a still picture is being reproduced, detecting a picture type of a picture corresponding to the still picture; a bit rate calculation section for, while the still picture is being reproduced, calculating a number of bits included in the picture, and while a moving picture is being reproduced, calculating an average bit rate per predetermined time unit; and a video signal generation section for, while the still picture is being reproduced, generating a first bit rate video signal for displaying the picture type and the number of bits, and while a moving picture is being reproduced, generating a second bit rate video signal for displaying the average bit rate.

10 Claims, 4 Drawing Sheets

METHOD AND APPARATUS FOR REPRODUCING IMAGES

BACKGROUND OF THE INVENTION

1. Field of the Invention

The present invention relates to a video reproduction apparatus and a video reproduction method, and in particular to a video reproduction apparatus and a video reproduction method for, when a video bit stream having a compressed video signal, such as an MPEG video signal, recorded therein is input and expanded to decode the compressed video signal into an original video signal, displaying information regarding a bit rate of the video bit stream.

2. Description of the Related Art

Figure 4:
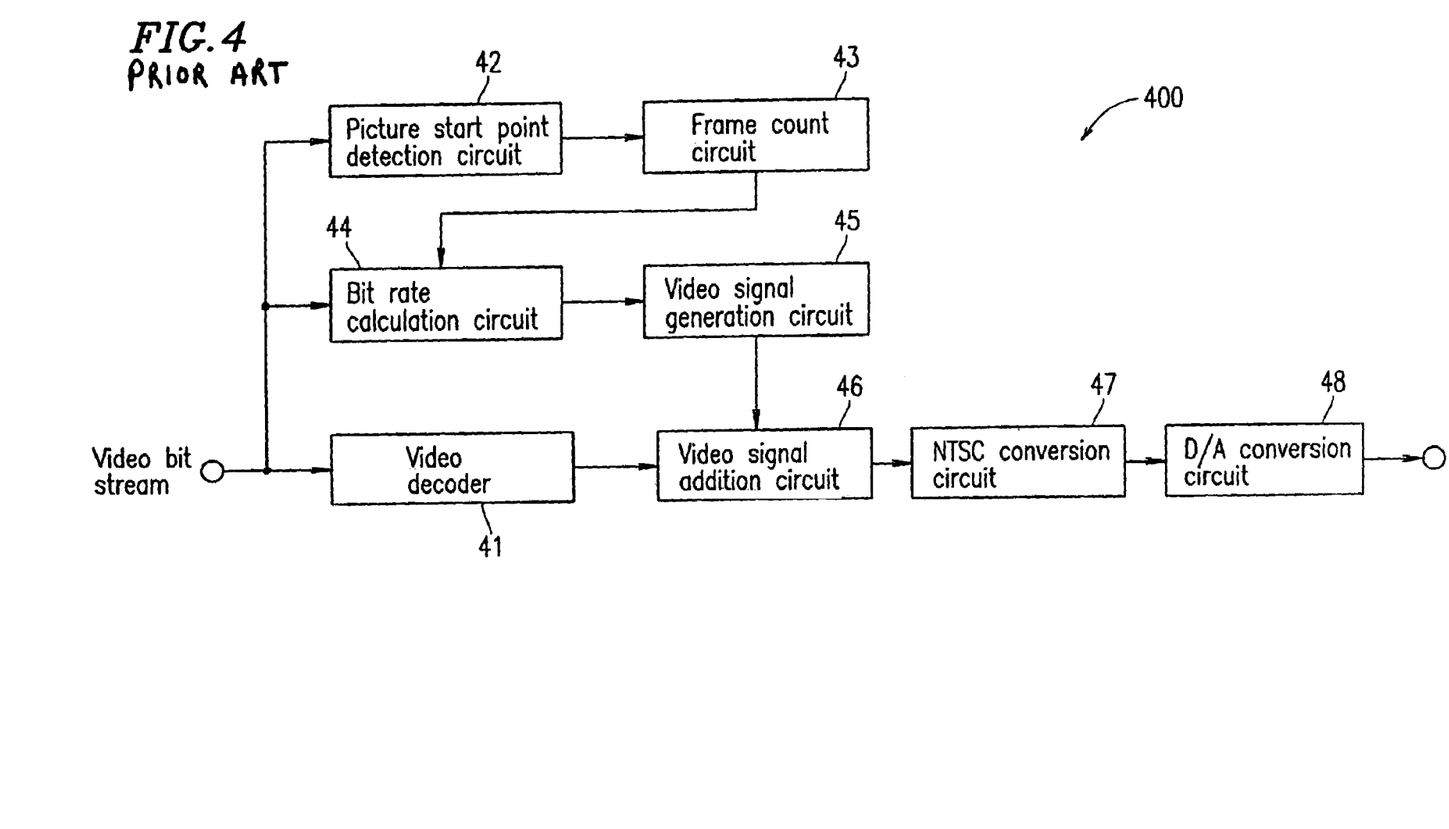
FIG. 4 is a block diagram illustrating a structure of a conventional video reproduction apparatus.

FIG. 4 is a block diagram of a conventional video reproduction apparatus 400. The video reproduction apparatus 400 reproduces a video signal based on a video bit stream including a plurality of pictures and having a picture type of each of the plurality of pictures recorded therein.

In this specification, the term "picture type" refers to a type of inter-motion compensation frame encoding in an MPEG video encoding system as is well known, and can be one of three picture types of I picture (intra-coded picture), P picture (predictive coded picture) and B picture (bidirectionally-predictive coded picture). In general, a number of bits per picture is largest in the I picture, second largest in the P picture, and smallest in the B picture (I picture>P picture>B picture).

The video reproduction apparatus 400 includes a video decoder 41 for receiving and expanding a video bit stream and thus outputting a video signal, a picture start point detection circuit 42 for receiving the video bit stream and detecting a picture start point which represents a start point of each of a plurality of pictures included in the video bit stream, and a frame count circuit 43 for counting a number of times that the picture start point detection circuit 42 detects the picture start point and measuring a predetermined time unit. The video reproduction apparatus 400 also includes a bit rate calculation circuit 44 for counting a number of bits included in each of the pictures in the video bit stream for the predetermined time unit and outputting the counted number of bits as an average bit rate, and a video signal generation circuit 45 for receiving the output from the bit rate calculation circuit 44 and generating a bit rate video signal for displaying the average bit rate. The video reproduction apparatus 400 further includes a video signal addition circuit 46 for adding the video signal output from the video decoder 41 and the bit rate video signal output from the video signal generation circuit 45, an NTSC conversion circuit 47 for converting the video signal obtained by the video signal addition circuit 46 into a video signal of an NTSC format, and a D/A conversion circuit 48 for converting the output from the NTSC conversion circuit 47 into an analog signal.

The video reproduction apparatus 400 having the above-described structure operates as follows.

The video decoder 41 receives and expands a video bit stream, and thus outputs a video signal. The picture start point detection circuit 42 receives the video bit stream and detects a picture start point which represents a start point of each of a plurality of pictures. The frame count circuit 43 counts a number of times that the picture start point detection circuit 42 detects the picture start point and measures a predetermined time unit. The bit rate calculation circuit 44 counts a number of bits included in each of the pictures in the video bit stream while the frame count circuit 43 measures the predetermined time unit, and outputs the counted number of bits as an average bit rate. The video signal generation circuit 45 receives the output from the bit rate calculation circuit 44 and generates a bit rate video signal for displaying the average bit rate. The video signal addition circuit 46 adds the video signal output from the video decoder 41 and the bit rate video signal output from the video signal generation circuit 45. The NTSC conversion circuit 47 converts the video signal obtained by the video signal addition circuit 46 into a video signal of an NTSC format. The D/A conversion circuit 48 converts the output from the NTSC conversion circuit 47 into an analog signal.

In a conventional video reproduction apparatus, while a moving picture including a plurality of pictures is being reproduced, the average bit rate representing the total of the number of bits included in a plurality of pictures per time unit is displayed. However, while a still picture is being reproduced, the average bit rate relating to the plurality of pictures is not displayed since display of such an average bit rate is meaningless.

A reproduction apparatus is now demanded which, even while a still picture is being reproduced in, for example, a pause mode or in a frame-by-frame reproduction mode, can display information relating to the bit rate, such as the picture type or the number of bits of the picture corresponding to the still picture.

SUMMARY OF THE INVENTION

According to one aspect of the invention, a video reproduction apparatus for reproducing video data based on a video bit stream having a plurality of pictures and also having a picture type representing a type of encoding for each of the plurality of pictures is provided. The apparatus includes a picture type detection section for, while a still picture is being reproduced, detecting a picture type of a picture, from among the plurality of pictures, corresponding to the still picture; a bit rate calculation section for, while the still picture is being reproduced, calculating a number of bits included in the picture corresponding to the still picture, and while a moving picture is being reproduced, calculating an average bit rate per predetermined time unit; and a video signal generation section for, while the still picture is being reproduced, generating a first bit rate video signal for displaying the picture type detected by the picture type detection section and the number of bits calculated by the bit rate calculation section, and while a moving picture is being reproduced, generating a second bit rate video signal for displaying the average bit rate calculated by the bit rate calculation section.

In one embodiment of the invention, the video reproduction apparatus further includes a video decoder for expanding the video bit steam to generate a video signal; and a video signal addition section for, while the still picture is being reproduced, adding the video signal generated by the video decoder and the first bit rate video signal generated by the video signal generation section, and while the moving picture is being reproduced, adding the video signal generated by the video decoder and the second bit rate video signal generated by the video signal generation section.

In one embodiment of the invention, the bit rate calculation section includes a picture start point detection section for detecting a picture start point which represents a start point of each of the plurality of pictures; a bit number calculation section for, in response to the detection of the picture start point performed by the picture start point detection section, counting a number of bits included in each of the plurality of pictures; a frame count section for counting a number of picture start points detected by the picture start point detection section to measure the prescribed time unit; an addition section for, each time the picture start point detection section detects a picture start point, accumulatively adding the number of bits counted by the bit number calculation section, and outputting the resulting addition result as an average bit rate, while the predetermined time unit is measured; and a switch section for selecting and outputting either the number of bits counted by the bit number calculation section or the average bit rate obtained by the addition section.

In one embodiment of the invention, the bit rate calculation section includes a picture start point detection section for detecting a picture start point which represents a start point of each of the plurality of pictures and a GOP start point; a bit number calculation section for, in response to the detection of the picture start point performed by the picture start point detection section, counting a number of bits included in each of the plurality of pictures; a frame count section for counting a number of GOP picture start points detected by the picture start point detection section to measure the prescribed time unit; an addition section for, each time the picture start point detection section detects a picture start point, accumulatively adding the number of bits counted by the bit number calculation section, and outputting the resulting addition result as an average bit rate, while the predetermined time unit is measured; and a switch section for selecting and outputting either the number of bits counted by the bit number calculation section or the average bit rate obtained by the addition section.

In one embodiment of the invention, the bit rate calculation section includes a picture start point detection section for detecting a picture start point which represents a start point of each of the plurality of pictures and a GOP start point which represents a GOP start point; a bit number calculation section for, in response to the detection of the picture start point performed by the picture start point detection section, counting a number of bits included in each of the plurality of pictures; an addition section for, each time the picture start point detection section detects a picture start point, accumulatively adding the number of bits counted by the bit number calculation section, and outputting the resulting addition result as an average bit rate, until the GOP start point is detected; and a switch section for selecting and outputting either the number of bits counted by the bit number calculation section or the average bit rate obtained by the addition section.

In one embodiment of the invention, the bit rate calculation section includes a picture start point detection section for detecting a picture start point which represents a start point of each of the plurality of pictures; a bit number calculation section for, in response to the detection of the picture start point performed by the picture start point detection section, counting a number of bits included in each of the plurality of pictures; a timer for counting time to measure the predetermined time unit; an addition section for, each time the picture start point detection section detects a picture start point, accumulatively adding the number of bits counted by the bit number calculation section, and outputting the resulting addition result as an average bit rate, while the predetermined time unit is measured; and a switch section for selecting and outputting either the number of bits counted by the bit number calculation section or the average bit rate obtained by the addition section.

According to another aspect of the invention, a video reproduction method for reproducing video data based on a video bit stream having a plurality of pictures and also having a picture type representing a type of encoding for each of the plurality of pictures is provided. The method includes a picture type detection step of, while a still picture is being reproduced, detecting a picture type of a picture, from among the plurality of pictures, corresponding to the still picture; a bit rate calculation step of, while the still picture is being reproduced, calculating a number of bits included in the picture corresponding to the still picture, and while a moving picture is being reproduced, calculating an average bit rate per predetermined time unit; and a video signal generation step of, while the still picture is being reproduced, generating a first bit rate video signal for displaying the picture type detected by the picture type detection step and the number of bits calculated by the bit rate calculation step, and while a moving picture is being reproduced, generating a second bit rate video signal for displaying the average bit rate calculated by the bit rate calculation step.

In one embodiment of the invention, the video reproduction method further includes a video decoding step of expanding the video bit steam to generate a video signal; and a video signal addition step of, while the still picture is being reproduced, adding the video signal generated by the video decoding step and the first bit rate video signal generated by the video signal generation step, and while the moving picture is being reproduced, adding the video signal generated by the video decoding step and the second bit rate video signal generated by the video signal generation step.

In one embodiment of the invention, the bit rate calculation step includes a picture start point detection step of detecting a picture start point which represents a start point of each of the plurality of pictures; a bit number calculation step of, in response to the detection of the picture start point by the picture start point detection step, counting a number of bits included in each of the plurality of pictures; a frame count step of counting a number of picture start points detected by the picture start point detection step to measure the prescribed time unit; an addition step of, each time the picture start point detection step detects a picture start point, accumulatively adding the number of bits counted by the bit number calculation step, and outputting the resulting addition result as an average bit rate, while the predetermined time unit is measured; and a switch step of selecting and outputting either the number of bits counted by the bit number calculation step or the average bit rate obtained by the addition step.

In one embodiment of the invention, the bit rate calculation step includes a picture start point detection step of detecting a picture start point which represents a start point of each of the plurality of pictures and a GOP start point; a bit number calculation step of, in response to the detection of the picture start point by the picture start point detection step, counting a number of bits included in each of the plurality of pictures; a frame count step of counting a number of GOP picture start points detected by the picture start point detection step to measure the prescribed time unit; an addition step of, each time the picture start point detection step detects a picture start point, accumulatively adding the number of bits counted by the bit number calculation step, and outputting the resulting addition result as an average bit rate, while the predetermined time unit is measured; and a switch step of selecting and outputting either the number of bits counted by the bit number calculation step or the average bit rate obtained by the addition step.

In one embodiment of the invention, the bit rate calculation step includes a picture start point detection step of detecting a picture start point which represents a start point of each of the plurality of pictures and a GOP start point which represents a GOP start point; a bit number calculation step of, in response to the detection of the picture start point by the picture start point detection step, counting a number of bits included in each of the plurality of pictures; an addition step of, each time the picture start point detection step detects a picture start point, accumulatively adding the number of bits counted by the bit number calculation step, and outputting the resulting addition result as an average bit rate, until the GOP start point is detected; and a switch step of selecting and outputting either the number of bits counted by the bit number calculation step or the average bit rate obtained by the addition step.

In one embodiment of the invention, the bit rate calculation step includes a picture start point detection step of detecting a picture start point which represents a start point of each of the plurality of pictures; a bit number calculation step of, in response to the detection of the picture start point by the picture start point detection step, counting a number of bits included in each of the plurality of pictures; a timing step of counting time to measure the predetermined time unit; an addition step of, each time the picture start point detection step detects a picture start point, accumulatively adding the number of bits counted by the bit number calculation step, and outputting the resulting addition result as an average bit rate, while the predetermined time unit is measured; and a switch step of selecting and outputting either the number of bits counted by the bit number calculation step or the average bit rate obtained by the addition step.

According to one embodiment of the invention, while a moving picture is being reproduced, the bit rate calculation section outputs an average bit rate per predetermined time unit. While a still picture is being reproduced in, for example, a pause mode or in a frame-by-frame reproduction mode, the bit rate calculation section outputs the number of bits of a picture corresponding to the still picture, and also the picture type detection circuit outputs a picture type of the picture corresponding to the still picture.

Due to such a structure, while the moving picture is being reproduced, the average bit rate is displayed as second bit rate video information together with a video signal. While the still picture is being reproduced, the number of bits and the picture type of the picture corresponding to the still picture are displayed as first bit rate video information together with the video signal. Therefore, even while the still picture is being reproduced, the information regarding the bit rate, such as, for example, the number of bits and the picture type, can be displayed.

Thus, the invention described herein makes possible the advantages of providing a video reproduction apparatus and a video reproduction method for, even while a still picture is being reproduced in, for example, a pause mode or in a frame-by-frame reproduction mode, displaying information relating to the bit rate, such as the picture type or the number of bits of the picture corresponding to the still picture.

These and other advantages of the present invention will become apparent to those skilled in the art upon reading and understanding the following detailed description with reference to the accompanying figures.

DESCRIPTION OF THE EMBODIMENTS

Hereinafter, the present invention will be described by way of illustrative examples with reference to the accompanying drawings.

EXAMPLE 1

Figure 1:
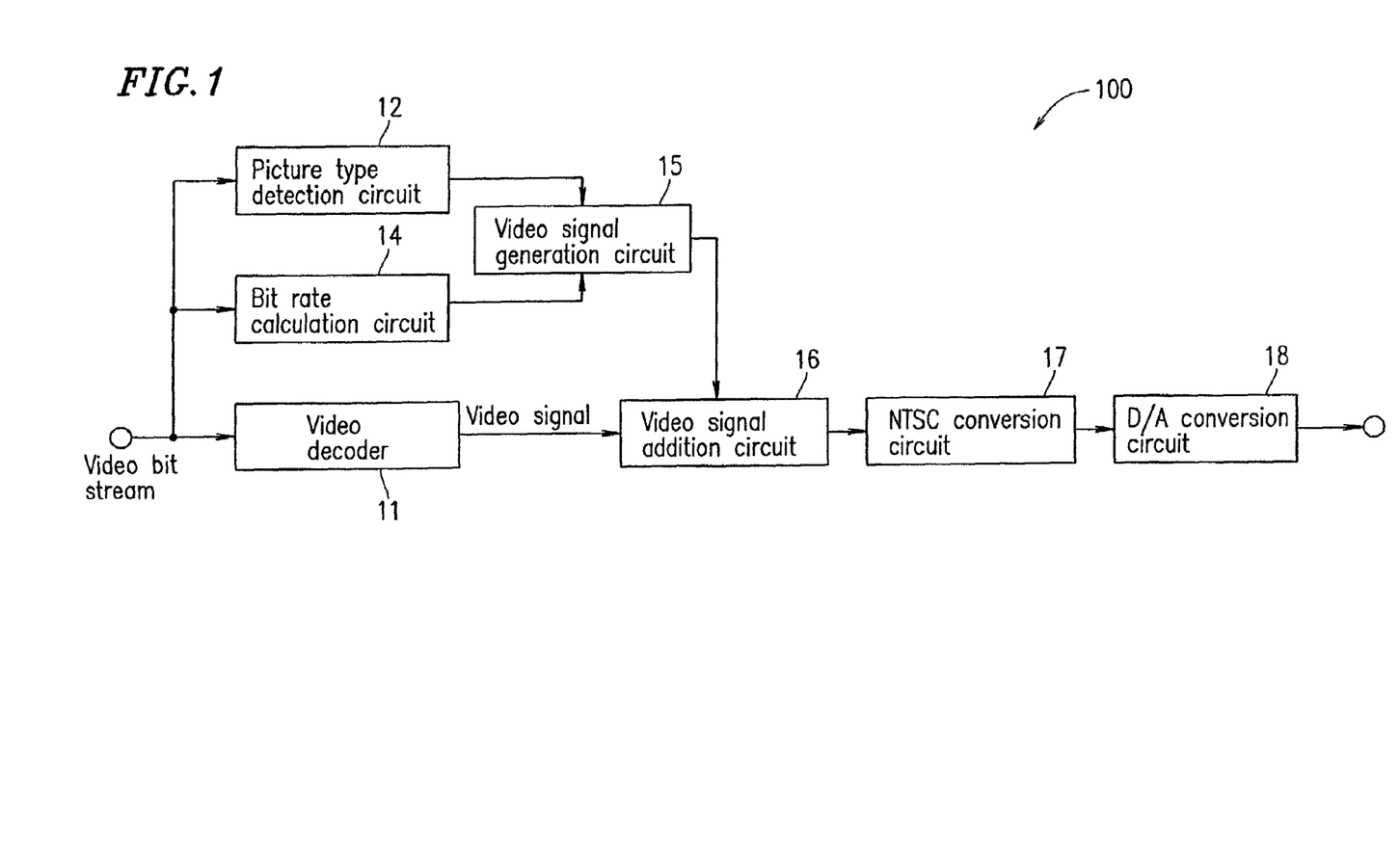
FIG. 1 is a block diagram illustrating a structure of a video reproduction apparatus according to a first example of the present invention.

FIG. 1 is a block diagram illustrating a structure of a video reproduction apparatus 100 according to a first example of the present invention. The video reproduction apparatus 100 reproduces a compressed video signal based on a video bit stream including a plurality of pictures representing the compressed video signal and having a picture type of each of the plurality of pictures recorded therein. While a still picture is being reproduced in, for example, a pause mode or in a frame-by-frame reproduction mode, the video reproduction apparatus 100 displays the picture type and a number of bits of the picture corresponding to the still picture.

As shown in FIG. 1, the video reproduction apparatus 100 includes a video decoder 11, a picture type detection circuit 12, a bit rate calculation circuit 14, a video signal generation circuit 15, a video signal addition circuit 16, an NTSC conversion circuit 17, and a D/A conversion circuit 18.

The video decoder 11 receives and expands a video bit stream and thus outputs a video signal. While a still picture is being reproduced, the picture type detection circuit 12 receives the video bit stream and detects a picture type of a picture corresponding to the still picture based on the video bit stream. The bit rate calculation circuit 14 calculates a number of bits per picture and an average bit rate per predetermined time unit based on the video bit stream. While the still picture is being reproduced, the bit rate calculation circuit 14 outputs a number of bits of the picture corresponding to the still picture; and while a moving picture is being reproduced, the bit rate calculation circuit 14 outputs the average bit rate per predetermined time unit. The video signal generation circuit 15 receives the output from the picture type detection circuit 12 and the output from the bit rate calculation circuit 14. While the still picture is being reproduced, the video signal generation circuit 15 generates a first bit rate video signal for displaying the picture type detected by the picture type detection circuit 12 and the number of bits obtained by the bit rate calculation circuit 14; and while the moving picture is being reproduced, the video signal generation circuit 15 generates a second bit rate video signal for displaying the average bit rate obtained by the bit rate calculation circuit 14. While the still picture is being reproduced, the video signal addition circuit 16 adds the video signal generated by the video decoder 11 and the first bit rate video signal generated by the video signal generation circuit 15; and while the moving picture is being reproduced, the video signal addition circuit 16 adds the video signal generated by the video decoder 11 and the second bit rate video signal generated by the video signal generation circuit 15. The NTSC conversion circuit 17 converts the video signal obtained by the video signal addition circuit 16 into a video signal of an NTSC format. The D/A conversion circuit 18 converts the output from the NTSC conversion circuit 17 into an analog signal.

Figure 2:
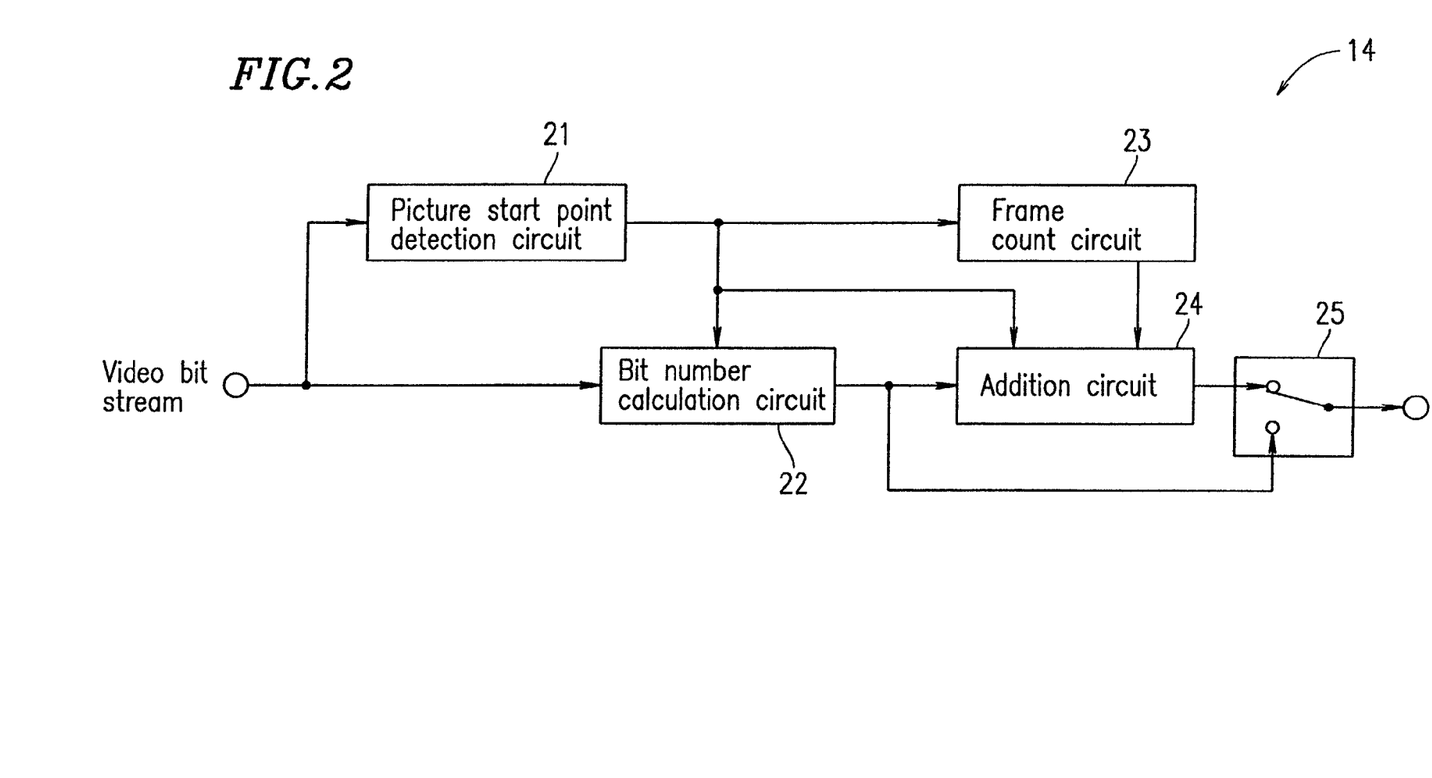
FIG. 2 is a block diagram illustrating a structure of a bit rate calculation circuit in the video reproduction apparatus shown in FIG. 1.

FIG. 2 is a block diagram of the bit rate calculation circuit 14 of the video reproduction apparatus 100 shown in FIG. 1. The bit rate calculation circuit 14 includes a picture start point detection circuit 21, a bit number calculation circuit 22, a frame count circuit 23, an addition circuit 24 and a switch circuit 25.

The picture start point detection circuit 21 detects a picture start point which represents a start point of each of a plurality of pictures included in the video bit stream. The bit number calculation circuit 22 counts a number of bits between a picture start point detected by the picture start point detection circuit 21 and the next picture start point detected by the picture start point detection circuit 21 (i.e., the number of bits of one picture). The frame count circuit 23 counts a predetermined number of picture start points detected by the picture start point detection circuit 21 (i.e., a predetermined number of times that the picture start point detection circuit 21 detects the picture start point) to measure a predetermined time unit. In the case of, for example, the NTSC system, the predetermined number of picture start points is 30 which corresponds to about 1 second. Each time a predetermined number of picture start points are counted, the frame count circuit 23 outputs a signal representing the termination of the counting of the predetermined number of picture start points. Each time the picture start point detection circuit 21 detects the picture start point, the addition circuit 24 accumulatively adds the number of bits counted by the bit number calculation circuit 22. Then, based on the signal representing the termination of the counting of the predetermined number of picture start points, the addition circuit 24 outputs, as an average bit rate, the resultant addition result, i.e., the number of bits accumulated while the predetermined number of picture start points (in the case of, for example, the NTSC system, 30 picture start points corresponding to about 1 second) are counted, i.e., while the predetermined time unit is measured. The switch circuit 25 selects either the number of bits of one picture which is output from the bit number calculation circuit 22 or the average bit rate which is output from the addition circuit 24 and outputs the selected signal.

The video reproduction apparatus 100 in the first example operates in the following manner.

Referring to FIG. 1, a video bit stream is input to the video decoder 11, the picture type detection circuit 12, and the bit rate calculation circuit 14. The video decoder 11 expands a compressed video signal represented by a plurality of pictures included in the video bit stream into an original video signal and outputs the video signal to the video signal addition circuit 16. While a still picture is being reproduced, the picture type detection circuit 12 analyzes the input video bit stream, detects the picture type (I picture, P picture or B picture) of the picture, corresponding to the still picture, described in the video bit stream, and outputs the detected picture type to the video signal generation circuit 15. The bit rate calculation circuit 14 calculates a number of bits of each picture and an average bit rate per predetermined time unit from the input video bit stream. While the still picture is being reproduced, the bit rate calculation circuit 14 outputs a number of bits of the picture corresponding to the still picture to the video signal generation circuit 15. While a moving picture is being reproduced, the bit rate calculation circuit 14 outputs the average bit rate per predetermined time unit to the video signal generation circuit 15.

While the still picture is being reproduced, the video signal generation circuit 15 generates a first bit rate video signal for displaying the picture type of the picture corresponding to the still picture which is detected by the picture type detection circuit 12 and the number of bits of the picture corresponding to the still picture which is obtained by the bit rate calculation circuit 14. While the moving picture is being reproduced, the video signal generation circuit 15 generates a second bit rate video signal for displaying the average bit rate per predetermined time unit which is obtained by the bit rate calculation circuit 14. As a video signal component, in the first bit rate video signal, which displays the picture type, the video signal generation circuit 15 generates a video signal component for displaying either "I", "P" or "B". As a video signal component, in the first bit rate video signal, which displays the number of bits, the video signal generation circuit 15 generates a video signal component representing the numerical value of the number of bits. As the second bit rate video signal representing the average bit rate, the video signal generation circuit 15 generates a video signal representing the numerical value of the average bit rate or a video signal geometrically representing the numerical value by, for example, a number of points or a length of a bar. The first bit rate video signal and the second bit rage video signal are output to the video signal addition circuit 16.

The video signal addition circuit 16 adds the video signal output from the video decoder 11 and the first bit rate video signal or the second bit rate video signal output from the video signal generation circuit 15 and outputs the addition result to the NTSC conversion circuit 17. The NTSC conversion circuit 17 converts the output from the video signal addition circuit 16 into a video signal of an NTSC format and outputs the converted video signal to the D/A conversion circuit 18. The D/A conversion circuit 18 converts the digital video signal of the NTSC format which is output from the NTSC conversion circuit 17 into an analog signal.

The operation of the bit rate calculation circuit 14 will be described in detail.

Referring to FIG. 2, the picture start point detection circuit 21 analyzes the input video bit stream and detects the start point of each of the plurality of pictures included in the video bit stream. Then, the picture start point detection circuit 21 outputs the result to the bit number calculation circuit 22, the frame count circuit 23, and the addition circuit 24. The bit number calculation circuit 22 uses the picture start point detected by the picture start point detection circuit 21 as a trigger to start counting the number of bits of the picture corresponding to the picture start point until the picture start point detection circuit 21 detects another picture start point. Thus, the number of bits of one picture is obtained. The obtained number of bits is output to the addition circuit 24 and the switch circuit 25. Then, the bit number calculation circuit 22 clears the counter used for counting the number of bits in preparation to count the next number of bits.

The frame count circuit 23 counts a predetermined number of the picture start points detected by the picture start point detection circuit 21. In the case of, for example, the NTSC system, the frame count circuit 23 counts 30 picture start points, which corresponds to about 1 second. Each time 30 picture start points are counted, the frame count circuit 23 notifies the addition circuit 24 that 30 picture start points have been counted.

Each time the picture start point detection circuit 21 detects a picture start point, the addition circuit 24 accumulatively adds the number of bits counted by the bit number calculation circuit 22. Based on the output from the frame count circuit 23, the addition circuit 24 outputs to the switch circuit 25, as an average bit rate, the number of bits accumulated while the predetermined number of picture start points (in the case of, for example, the NTSC system, 30 picture start points corresponding to about 1 second) are counted. Then, the addition circuit 24 clears the counter used for counting the number of bits in preparation to count the next number of bits.

While the still picture is being reproduced in, for example, a pause mode or in a frame-by-frame reproduction mode, the switch circuit 25 selects and outputs the bit number of one picture corresponding to the still picture, which is output from the bit number calculation circuit 22. While the moving picture is being reproduced, the switch circuit 25 selects and outputs the average bit rate which is output from the addition circuit 24.

In the first example, the frame count circuit 23 counts 30 picture start points in the case of the NTSC system. The present invention is not limited to this. In an alternative example, the bit rate calculation circuit operates as follows. The picture start point detection circuit 21 detects a GOP (group of picture) start point, which is detected every 0.5 second in general, and outputs the GOP start point to the frame count circuit 23, as well as the picture start point. Each time the frame count circuit 23 counts two GOP start points, the frame count circuit 23 notifies the addition circuit 24 that the two GOP start points have been counted. In this case, counting of only two GOP start points is sufficient, instead of 30 picture start points, and thus the structure of the frame count circuit 23 can be simplified.

In still another example, the picture start point detection circuit 21 detects a GOP start point as well as a picture start point, and outputs the information on both the GOP start point and the picture start point to the addition circuit 24. Each time a GOP start point is detected, the addition circuit 24 outputs the accumulated number of bits to the switch circuit 25 as an average bit rate. In this case, there is an advantage that the frame count circuit 23 is not necessary.

In still another example, a time counting circuit for counting a predetermined time unit is provided instead of the frame count circuit 23. Each time the time counting circuit counts the predetermined time unit, the addition circuit 24 outputs the accumulated number of bits to the switch circuit 25 as an average bit rate. In this case, there is an advantage that the switching operation of the counted value which otherwise needs to be performed by the frame count circuit 23 depending on whether the system is PAL (25 frames/sec.) or NTSC (30 frames/sec.) is not necessary.

As described above, in the first example, while a moving picture is being reproduced, the switch 25 selects the output from the addition circuit 24 and outputs the average bit rate per predetermined time unit. Thus, the average bit rate is displayed. While a still picture is being reproduced in, for example, a pause mode or in a frame-by-frame reproduction mode, the switch 25 selects the output from the bit number calculation circuit 22 and outputs the number of bits of the picture corresponding to the still picture, and also, the picture type detection circuit 12 detects and outputs the picture type of the picture corresponding to the still picture. Thus, both the picture type and the number of bits are displayed. Since the viewer can clearly recognize the picture type and the number of bits of the still picture, the viewer can select, as a picture used for quality adjustment, a picture which, for example, has a sufficiently large number of bits among the I pictures, which have generally a high precision.

Since the information on the bit rate of the video bit stream is displayed during reproduction of a still picture as well as a moving picture, there is an advantage that the viewer can objectively evaluate the quality of both the still picture and the moving picture.

EXAMPLE 2

In a second example of the present invention, a video reproduction apparatus in which the functions of the picture type detection circuit 12 and the bit rate calculation circuit 14 are realized by software will be described.

Figure 3:
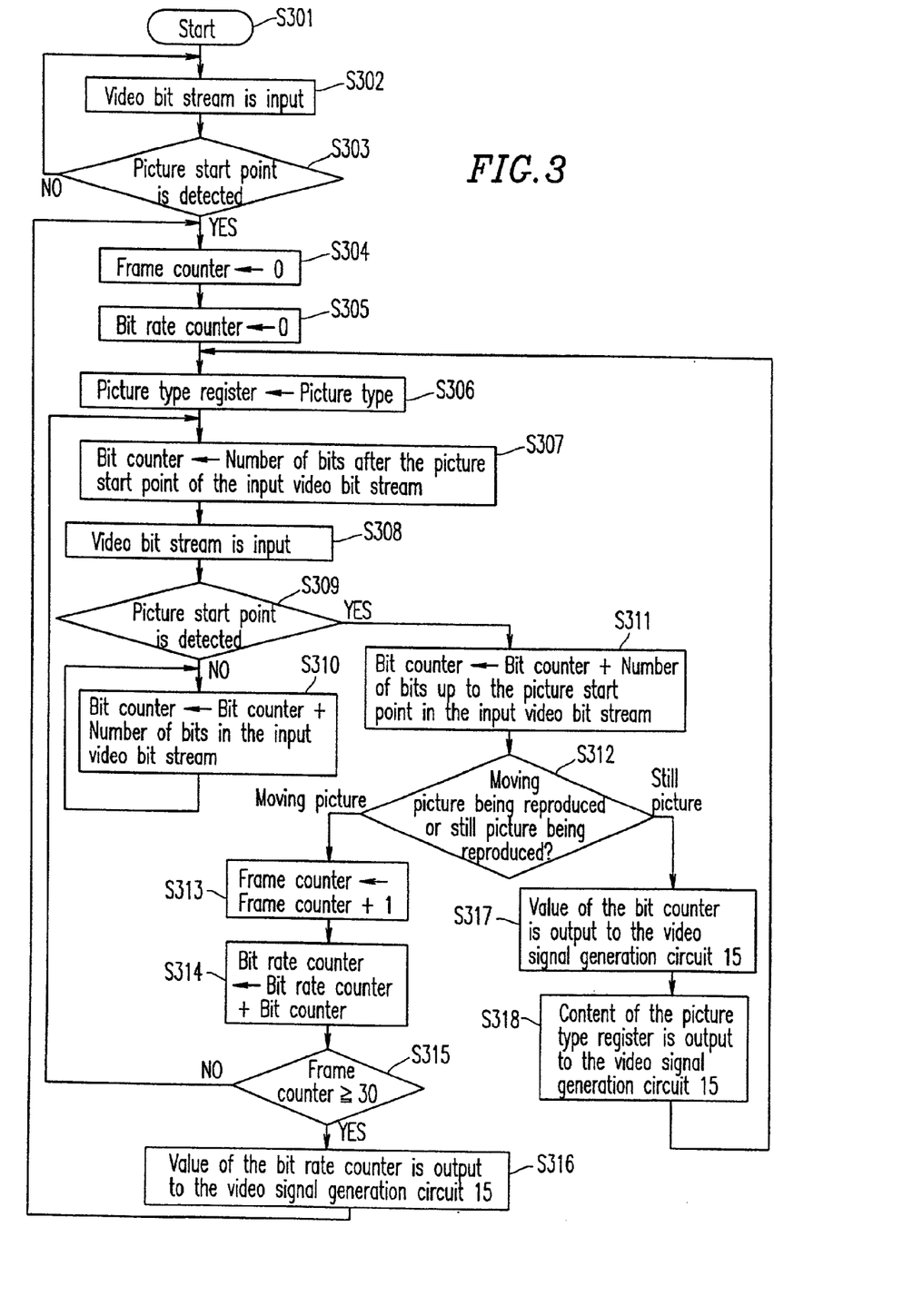
FIG. 3 is a flowchart illustrating a video reproduction method according to a second example of the present invention.

FIG. 3 is a flowchart illustrating a video reproduction method according to the present invention. In the following description, the letter "S" in "S301", "S302" and so on represents a "step".

In S301, processing is started. In S302, a predetermined unit length of a video bit stream is input to the video reproduction apparatus. In S303, it is determined whether the input unit length of the video bit stream has a picture start point or not. When no picture start point is detected ("NO" in S303), processing returns to S302, where the next predetermined unit length of the video bit stream is input. When a picture start point is detected ("YES" in S303), processing proceeds to S304.

In S304, a frame counter is cleared, and in S305, a bit rate counter is cleared. In S306, the picture type (I picture, P picture or B picture) which is described immediately after the picture start point in the video bit stream is stored in a picture type register. In S307, the number of bits after the picture start point of the input unit length of the video steam is stored in a bit counter.

In S308, the next predetermined unit length of the video bit stream is input. In S309, it is determined whether the input unit length of the video bit stream has a picture start point or not. When no picture start point is detected ("NO" in S309), in S310, the number of bits of the unit length of the video bit stream which has been input in S308 is added to the bit counter. Then, processing returns to S308, where the next predetermined unit length of the video bit stream is input. When a picture start point is detected ("YES" in S309), processing proceeds to S311.

In S311, the number of bits until the picture start point of the unit length of the video bit stream, which has been input in S308, is added to the bit counter. Then, in S312, it is determined whether a moving picture is being reproduced or a still picture is being reproduced in, for example, a pause mode or in a frame-by-frame reproduction mode. When the moving picture is being reproduced, processing proceeds to S313. When the still picture is being reproduced, processing proceeds to S317.

In S313, the frame counter is incremented by one. In S314, the value of the bit counter is added to the bit rate counter. In S315, the value of the frame counter is checked. In the case of, for example, the NTSC system, it is determined whether the value of the frame counter is at least 30 (corresponding to about 1 second) or not. When the value is less than 30 ("NO" in S315), processing returns to S307. When the value is at least 30 ("YES" in S315), processing proceeds to S316. In S316, the value of the bit rate counter is output to the video signal generation circuit 15, and processing returns to S304.

As described above, when the still picture is being reproduced, processing proceeds to S317. In S317, the value of the bit counter corresponding to the number of bits of one picture is output to the video signal generation circuit 15.

Then, in S318, the content of the picture type register is output to the video signal generation circuit 15, and processing returns to S306.

In the second example, in S315, it is determined whether the value of the frame counter is at least 30 in the case of the NTSC system. The present invention is not limited to this. In an alternative example, in S309, a GOP (group of picture) start point is detected, which is detected every 0.5 seconds in general, as well as a picture start point in the MPEG video coding system. In S315, it is determined whether two GOP start points have been detected or not (instead of whether the value of the frame counter is at least 30). In this case, the operations of frame counter in S304 and S313 are not necessary.

In still another example, a timer for counting a predetermined time unit is provided instead of the frame counter. In S304, the timer is cleared, instead of the frame counter. In S315, it is determined whether the timer has completed counting a predetermined time unit or not (instead of whether the value of the frame counter is at least 30). In this case, the operation of S313 is not necessary, and moreover, it is not necessary to switch the condition of S315 depending on whether the system is PAL (25 frames/sec.) or the NTSC (30 frames/sec.).

As described above, in the second example, the functions of the picture type detection circuit 12 and the bit rate calculation circuit 14 shown in FIG. 1 can be realized by software. The same effect as that of the first example is provided.

The present invention provides a video reproduction apparatus and a video reproduction method for, while a still picture is being reproduced in, for example, a pause mode or in a frame-by-frame reproduction mode, displaying the picture type and the number of bits of the picture corresponding to the still picture.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video reproduction apparatus for reproducing video data based on a video bit stream having a plurality of pictures and also having a picture type representing a type of encoding for each of the plurality of pictures, for facilitating image quality adjustment of one or more of the plurality of pictures, the apparatus comprising:
   a picture type detection section for, while a still picture from said video bit stream is being reproduced, detecting a picture type of a picture, from among the plurality of pictures, corresponding to the still picture;
   a bit rate calculation section for, while the still picture is being reproduced, calculating a number of bits included in the picture corresponding to the still picture, and while a moving picture from said video bit stream is being reproduced, calculating an average bit rate per predetermined time unit, and selecting and outputting either the number of bits included in the picture corresponding to the still picture or the average bit rate per predetermined time unit;
   a video signal generation section for, while the still picture is being reproduced, generating a first bit rate video signal for displaying the picture type detected by the picture type detection section and the number of bits calculated by the bit rate calculation section, and while the moving picture is being reproduced, generating a second bit rate video signal for displaying the average bit rate calculated by the bit rate calculation section;
   a video decoder for expanding the video bit stream to generate a video signal; and
   a video signal addition section for, while the still picture is being reproduced, adding the video signal generated by the video decoder and the first bit rate video signal generated by the video signal generation section so that a) the still picture, b) an identification of the picture type of the still picture, and c) a value corresponding to the number of bits of the still picture are displayed simultaneously, and while the moving picture is being reproduced, adding the video signal generated by the video decoder and the second bit rate video signal generated by the video signal generation section so that the moving picture and the average bit rate are displayed simultaneously.

2. A video reproduction apparatus according to claim 1, wherein the bit rate calculation section includes:
   a picture start point detection section for detecting a picture start point which represents a start point of each of the plurality of pictures;
   a bit number calculation section for, in response to the detection of the picture start point performed by the picture start point detection section, counting the number of bits included in each of the plurality of pictures;
   a frame count section for counting a number of picture start points detected by the picture start point detection section to measure the prescribed time unit;
   an addition section for, each time the picture start point detection section detects the picture start point, accumulatively adding the number of bits counted by the bit number calculation section, and outputting a resulting addition result as the average bit rate, while the predetermined time unit is measured; and
   a switch section for selecting and outputting either the number of bits counted by the bit number calculation section or the average bit rate obtained by the addition section.

3. A video reproduction apparatus according to claim 1, wherein the bit rate calculation section includes:
   a picture start point detection section for detecting a picture start point which represents a start point of each of the plurality of pictures and a GOP start point;
   a bit number calculation section for, in response to the detection of the picture start point performed by the picture start point detection section, counting the number of bits included in each of the plurality of pictures;
   a frame count section for counting a number of GOP picture start points detected by the picture start point detection section to measure the prescribed time unit;
   an addition section for, each time the picture start point detection section detects the picture start point, accumulatively adding the number of bits counted by the bit number calculation section, and outputting a resulting addition result as the average bit rate, while the predetermined time unit is measure; and
   a switch section for selecting and outputting either the number of bits counted by the bit number calculation section or the average bit rate obtained by the addition section.

4. A video reproduction apparatus according to claim 1, wherein the bit rate calculation section includes:
   a picture start point detection section for detecting a picture start point which represents a start point of each of the plurality of pictures and a GOP start point which represents a GOP start point;

a bit number calculation section for, in response to the detection of the picture start point performed by the picture start point detection section, counting the number of bits included in each of the plurality of pictures;

an addition section for, each time the picture start point detection section detects the picture start point, accumulatively adding the number of bits counted by the bit number calculation section, and outputting a resulting addition result as the average bit rate, until the GOP start point is detected; and a switch section for selecting and outputting either the number of bits counted by the bit number calculation section or the average bit rate obtained by the addition section.

5. A video reproduction apparatus according to claim 1, wherein the bit rate calculation section includes:

a picture start point detection section for detecting a picture start point which represents a start point of each of the plurality of pictures;

a bit number calculation section for, in response to the detection of the picture start point performed by the picture start point detection section, counting the number of bits included in each of the plurality of pictures;

a timer for counting time to measure the predetermined time unit;

an addition section for, each time the picture start point detection section detects the picture start point, accumulatively adding the number of bits counted by the bit number calculation section, and outputting the resulting addition result as the average bit rate, while the predetermined time unit is measured; and a switch section for selecting and outputting either the number of bits counted by the bit number calculation section or the average bit rate obtained by the addition section.

6. A video reproduction method for reproducing video data based on a video bit stream having a plurality of pictures and also having a picture type representing a type of encoding for each of the plurality of pictures, for facilitating image quality adjustment of one or more of the plurality of pictures for facilitating image quality adjustment of one or more of the plurality of pictures, the method comprising:

a picture type detection step of, while a still picture from said video bit stream is being reproduced, detecting a picture type of a picture, from among the plurality of pictures, corresponding to the still picture;

a bit rate calculation step of, while the still picture is being reproduced, calculating a number of bits included in the picture corresponding to the still picture, and while a moving picture from said video bit stream is being reproduced, calculating an average bit rate per predetermined time unit, and selecting and outputting either the number of bits included in the picture corresponding to the still picture or the average bit rate per predetermined time unit;

a video signal generation step of, while the still picture is being reproduced, generating a first bit rate video signal for displaying the picture type detected by the picture type detection step and the number of bits calculated by the bit rate calculation step, and while the moving picture is being reproduced, generating a second bit rate video signal for displaying the average bit rate calculated by the bit rate calculation step;

a video decoding step of expanding the video bit stream to generate a video signal;

a video signal addition step of, while the still picture is being reproduced, adding the video signal generated by the video decoding step and the first bit rate video signal generated by the video signal generation step section so that a) the still picture, b) an identification of the picture type of the still picture, and c) a value corresponding to the number of bits of the still picture are displayed simultaneously, and while the moving picture is being reproduced, adding the video signal generated by the video decoding step and the second bit rate video signal generated by the video signal generation step so that the moving picture and the average bit rate are displayed simultaneously.

7. A video reproduction method according to claim 6, wherein the bit rate calculation step includes:

a picture start point detection step of detecting a picture start point which represents a start point of each of the plurality of pictures;

a bit number calculation step of, in response to the detection of the picture start point by the picture start point detection step, counting the number of bits included in each of the plurality of pictures;

a frame count step of counting a number of picture start points detected by the picture start point detection step to measure the prescribed time unit;

an addition step of, each time the picture start point detection step detects the picture start point, accumulatively adding the number of bits counted by the bit number calculation step, and outputting a resulting addition result as the average bit rate, while the predetermined time unit is measured; and a switch step of selecting and outputting either the number of bits counted by the bit number calculation step or the average bit rate obtained by the addition step.

8. A video reproduction method according to claim 6, wherein the bit rate calculation step includes:

a picture start point detection step of detecting a picture start point which represents a start point of each of the plurality of pictures and a GOP start point;

a bit number calculation step of, in response to the detection of the picture start point by the picture start point detection step, counting the number of bits included in each of the plurality of pictures;

a frame count step of counting a number of GOP picture start points detected by the picture start point detection step to measure the prescribed time unit;

an addition step of, each time the picture start point detection step detects the picture start point, accumulatively adding the number of bits counted by the bit number calculation step, and outputting a resulting addition result as the average bit rate, while the predetermined time unit is measured; and a switch step of selecting and outputting either the number of bits counted by the bit number calculation step or the average bit rate obtained by the addition step.

9. A video reproduction method according to claim 6, wherein the bit rate calculation step includes:

a picture start point detection step of detecting a picture start point which represents a start point of each of the plurality of pictures and a GOP start point which represents a GOP start point;

a bit number calculation step of, in response to the detection of the picture start point by the picture start point detection step, counting the number of bits included in each of the plurality of pictures;

an addition step of, each time the picture start point detection step detects the picture start point, accumulatively adding the number of bits counted by the bit number calculation step, and outputting a resulting addition result as the average bit rate, until the GOP start point is detected; and a switch step of selecting and outputting either the number of bits counted by the bit number calculation step or the average bit rate obtained by the addition step.

10. A video reproduction method according to claim 6, wherein the bit rate calculation step includes:

a picture start point detection step of detecting a picture start point which represents a start point of each of the plurality of pictures;

a bit number calculation step of, in response to the detection of the picture start point by the picture start point detection step, counting the number of bits included in each of the plurality of pictures;

a timing step of counting time to measure the predetermined time unit;

an addition step of, each time the picture start point detection step detects the picture start point, accumulatively adding the number of bits counted by the bit number calculation step, and outputting a resulting addition result as the average bit rate, while the predetermined time unit is measured; and a switch step of selecting and outputting either the number of bits counted by the bit number calculation step or the average bit rate obtained by the addition step.

* * * * *